Nov. 18, 1958   M. E. RYAN   2,860,842
WIND UP REEL MEANS FOR ANCHOR LINES
Filed March 8, 1954
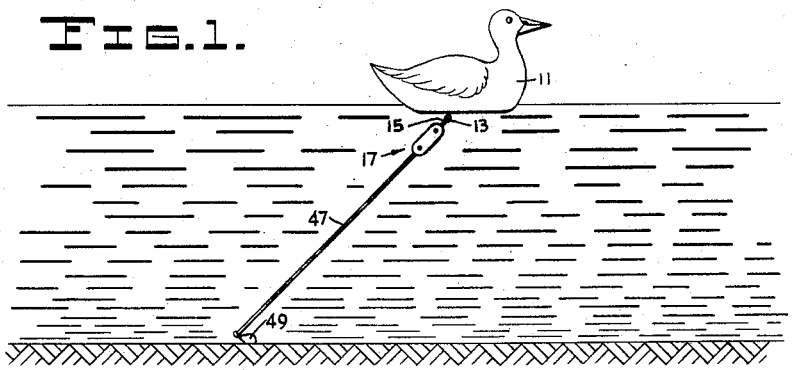
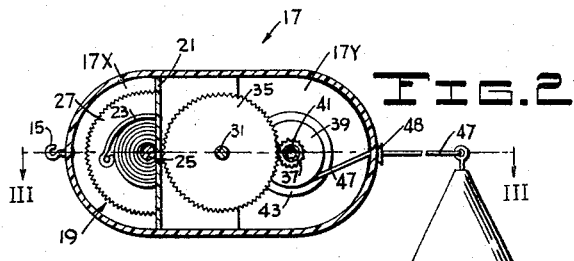
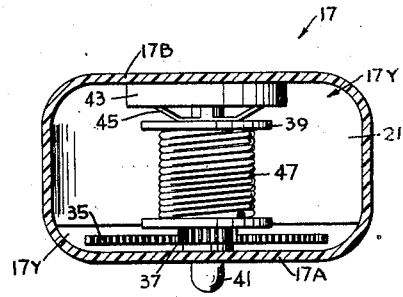
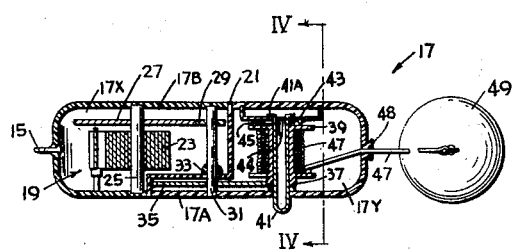
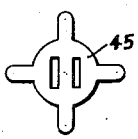
INVENTOR
MICHAEL E. RYAN 2,860,842
Patented Nov. 18, 1958

2,860,842

WIND UP REEL MEANS FOR ANCHOR LINES

Michael E. Ryan, Memphis, Tenn.

Application March 8, 1954, Serial No. 414,759

5 Claims. (Cl. 242—107.3)

This invention relates to a spring-powered reel for decoy anchor lines.

More particularly the invention relates to a reel structure adapted for easy attachment to and removal from the bottom of a floating decoy, said reel structure comprising the housing divided into two compartments, the first of which houses a reel for the decoy anchor line and a brake device of simple and effective design, the second compartment being water-tightly sealed from the first compartment and containing therein the spring motor for automatically winding the reel to retract the anchor line when said brake device is released, whereby the life of the spring motor is greatly lengthened by its protection from the corrosive action of the water, and a gear train connecting said spring motor to said reel, whereby a relatively strong spring may be used and may be taxed only through such a minor portion of its power output capacity that excessive and objectionable differences in winding forces exerted at the extreme ends of the winding and unwinding of the reel is obviated.

Specifically the invention relates to a reel for decoy anchor lines comprising a housing having a partition therein dividing said housing into a water-tight compartment toward one end of the housing and a second compartment toward the other end of the housing with an opening therein for the passage of the anchor line, a spring motor housed in said water-tight compartment, a relatively large gear driven by said spring motor, a smaller gear meshing with and driven by said relatively large gear and fixed to a shaft passing through a packing gland mounted on said partition, another relatively large gear on the opposite side of said partition mounted on said shaft and driven therewith, a reel for carrying an anchor line coupled to another relatively small gear meshing with and driven by said last-mentioned large gear, a shaft mounting said reel and having one end protruding through an opening in said reel housing, said shaft being axially movable and carrying on its other end a spring-type brake device normally engaging one side of said reel to prevent rotation thereof and being depressible by inward pressure upon said reel mounting shaft to release the braking action of said brake device.

The principal object of this invention is to provide a spring-powered reel for decoy anchor lines in which the spring motor is housed in a water-tightly sealed compartment whereby to insure long life by excluding corrosion-inducing water from said motor housing.

Another object of this invention is to provide a spring-powered reel for decoy anchor lines in which a very simple yet highly effective brake mechanism is provided.

A further object of the invention is to provide a reel for decoy anchor lines having a relatively powerful spring motor therein and a high ratio gear train connecting the same to the reel structure whereby only a portion of the potential power output of said motor is taxed and whereby a relatively even operating force is exerted over the entire range of operation of said reel.

A further object of the invention is to provide a unitary and compact spring-powered reel for decoy anchor lines, said reel being adapted for easy attachability and removal from decoys of various sizes and types, whereby a single reel may be selectively used with several decoys.

An overall object of the invention is to generally improve the design and efficiency of spring-powered reels for decoy anchor lines.

The means by which the foregoing and other objects of this invention are accomplished and the manner of their accomplishment will be readily understood from the following specification upon reference to the accompanying drawings, in which:

Fig. 1 is an elevational view showing a typical use of the present invention.

Fig. 2 is a side elevational view of the reel, with a cover portion removed.

Fig. 3 is an elevational view of the reel structure of Fig. 2, in section, taken as on the line III—III of Fig. 2.

Fig. 4 is an enlarged detailed elevational view, in section, taken on the line IV—IV of Fig. 3.

Fig. 5 is a face view of the spider brake member of the present invention on the scale of Fig. 4.

Referring now to the drawings in which the various parts are indicated by numerals, the numeral 11 designates a decoy, which for purpose of illustration herein is shown as being an imitation floating duck. Decoy 11 has attached to its bottom a screw eye or other loop presenting means 13 for cooperation with the hook 15 mounted on one end of the reel housing 17.

The reel housing 17 is relatively flat and is somewhat elongated, having parallel front and rear walls 17A and 17B. Housing 17 may be made of any suitable material, but preferably is formed of a plastic which may be thermally bonded and is highly resistant to corrosive action of fresh or salt water, or both. The interior of the housing is divided by a stepped partition 21 into a motor housing chamber 17X and a reel housing chamber 17Y. Housing chamber 17X (the left side of the showing of Figs. 2 and 3) houses the spring motor, generally designated 19, and the first part of the gear train, later to be described. The motor housing chamber 17X of the casing 17 is water-tightly sealed by the stepped partition 21 so as to exclude water from the said chamber. The motor 19 comprises a coiled spring 23 mounted on a shaft 25. Shaft 25 is journalled on sockets formed in the wall panels 17A and 17B, as is shown in Fig. 3. Shaft 25 extends transversely across chamber 17X and has rigidly attached thereto a relatively large gear 27. Gear 27 drives a relatively small gear 29 within chamber 17X, gear 29 being mounted on a shaft 31, and the ratio of gear 27 to gear 29 being of the nature of four to one. Shaft 31 is also journalled on sockets formed in the walls 17A and 17B and is additionally provided with bearing means in the stepped partition 21 through which shaft 31 extends. Any suitable packing means, schematically represented by the element 33, is provided at said last mentioned bearing to prevent any water that may enter reel housing chamber 17Y from seeping past shaft 31 and into the motor housing chamber 17X. The part of shaft 31 beyond the stepped partition 21 and in chamber 17Y carries a second relatively large gear 35. This latter gear 35 drives a second relatively small gear 37 which is rigidly attached to the reel 39, the ratio of gear 35 to gear 37 preferably being of the nature of four to one.

As best shown in Figs. 3 and 4, the reel 39 is rotatably mounted on a relatively large shaft 41, which shaft extends from an inverted cup-shaped base member 43 fixed to the reel housing wall 17B within chamber 17Y through the hollow hub or axle of the reel 39, and then outwardly through an aperture in the wall 17A, protruding from casing 17 a distance sufficient to permit thumb or finger operation thereof for the purpose of controlling a reel-braking mechanism, next to be described.

Base 43, as can be seen in Fig. 3, is an inverted cup having apertures therein to receive the fingers 41A formed on the inner end of the shaft 41, the shaft being axially slotted as at 44 adjacent its inner end and through a minor portion of its length to define the fingers 41A. Fingers 41A are bent over, as shown (Fig. 3) to limit the outward movement of the shaft 41. The axially extending slots 44 in the inner end of shaft 41 straddle elements of a spider-like resilient brake member 45. Brake member 45 bears against base member 43, and the central portion of the brake member is normally pressed by its own spring bias and urged away from member 43 into firm braking engagement with the adjacent end of the reel 39. An inward pressure against the protruding end of the shaft 41, it will be observed, will force the ends of slots 44 against the spider 45 adjacent the central portion and move the spider out of engagement with the end of the reel 39 against the bias of the spider, thus permitting the spring motor 19 to act through the gear train 27, 37 to rotate the reel so as to wind up the anchor line 47, which extends outwardly through aperture 48 preferably formed in the end wall of chamber 17Y. At the lower end of the anchor line 47 there is attached any suitable or desired anchor 49, which herein is shown as being a relatively large lead sinker.

It will be seen that spring motor 19 is constantly under tension urging wind-up drive of reel 39. When it is desired to anchor a decoy, as in Fig. 1, line 47 may be manually payed out, being withdrawn outwardly through aperture 48, rotating reel 39 against spring motor 19, but due to the high ratio gear train, effecting only a minute increase in the tension on spring 19.

I claim:

1. A spring powered reel for floating decoys, comprising an elongated casing having at least two walls relatively close together and substantially parallel, oppositely located bearing seats formed in the facing surfaces of said walls, at least two shafts journalled in pairs of said seats, a clock-motor-type spiral ribbon spring fixed at its inner end to a first one of said shafts and fixedly connected to said casing at its outer end, a relatively large gear fastened to said first shaft, a relatively small gear fixedly mounted on the second one of said shafts and drivingly coupled thereby to said large gear, a second relatively large gear fixed to said second shaft, a water-tight partition dividing said casing into two chambers, said partition being stepped so as to provide an intermediate section, said intermediate section being provided with an aperture, said second shaft extending through said aperture, packing means for leak-proofing the passage of said second shaft through said partition, said second relatively large gear being fixed to said second shaft on one side of said partition and said relatively small gear being fixed to said shaft on the other side of said partition, a reel mounted in said casing beyond said partition, a second relatively small gear attached to said reel for driven cooperation with said second large gear, an axially movable shaft rotatably mounting said reel and having one end thereof extending through a wall of said casing for external operation thereof, and a spring-spider brake normally pressed against an end wall of said reel to prevent rotation thereof by said ribbon spring, said axially movable shaft having means engageable with said brake to release said reel for automatic winding of an anchor line thereon.

2. Structure according to claim 1, said brake comprising a cup-shaped spider, said axially movable shaft being hollow and having slots embracing parts of said spider, a bearing member for the inner end of said hollow shaft, said brake spider being normally brakingly compressed between said reel and said bearing member, said slots in said hollow shaft being of such length that their bottoms engage and force said spider away from said reel upon desired inward movement of said hollow shaft by pressure on the protruding outer end thereof.

3. A spring-powered reel for floating decoys, comprising a casing, including a pair of substantially parallel walls, an anchor line reel housed within said casing, a gear train drivingly coupled at one end to said reel, a spring motor drivingly connected to the other end of said gear train, said casing including a partition dividing said casing into a pair of segregated chambers, one of said chambers being water-tight and housing said spring motor, said partition being stepped and including a portion substantially perpendicular to said walls and an additional portion substantially parallel to said walls, said additional portion being provided with an aperture, said gear train including a shaft intermediate the ends of said gear train water-tightly journalled in said aperture and extending through said partition additional portion.

4. A device in accordance with claim 3, which includes brake means biased for normally preventing rotation of said reel, and means operable from the exterior of said casing for releasing said brake means to free said reel for winding of an anchor line thereon responsive to spring-motor drive.

5. A device in accordance with claim 3, in which said gear train provides a relatively great motor-to-reel speed differential.

References Cited in the file of this patent

UNITED STATES PATENTS

| | | |
|---|---|---|
| 489,815 | Hume | Jan. 10, 1893 |
| 511,795 | Pitel | Jan. 2, 1894 |
| 516,871 | Mills | Mar. 20, 1894 |
| 599,138 | Boyle | Feb. 15, 1898 |
| 1,967,902 | Reichel | July 24, 1934 |
| 2,462,975 | King | Mar. 1, 1949 |
| 2,501,230 | McHan | Mar. 21, 1950 |
| 2,514,144 | Shedlock | July 4, 1950 |
| 2,523,811 | Buehl | Sept. 26, 1950 |
| 2,539,727 | Clark | Jan. 30, 1951 |
| 2,559,111 | Carroll | July 3, 1951 |
| 2,654,972 | Hollingsworth | Oct. 13, 1953 |
| 2,678,778 | Gibson | May 18, 1954 |

FOREIGN PATENTS

| | | |
|---|---|---|
| 4,106 | Great Britain | Feb. 24, 1908 |